United States Patent [19]

Zauner

[11] 4,441,908

[45] Apr. 10, 1984

[54] VIAL TOOLING APPARATUS

[75] Inventor: Otto Zauner, Vineland, N.J.

[73] Assignee: Owens-Illinois, Inc., Toledo, Ohio

[21] Appl. No.: 411,717

[22] Filed: Aug. 25, 1982

Related U.S. Application Data

[63] Continuation of Ser. No. 248,790, Mar. 30, 1981, abandoned.

[51] Int. Cl.³ .................... C03B 23/04; C03B 23/09
[52] U.S. Cl. ........................................ 65/109; 65/64; 65/108; 65/243; 65/277; 65/280; 65/292; 65/294; 65/296; 425/340; 425/341; 425/393; 425/394; 264/296; 264/322
[58] Field of Search ............... 65/108, 109, 64, 227, 65/244, 292, 296, 299, 277, 243, 246, 294, 297, 280; 264/296, 322; 425/340, 341, 343, 324.1, 393, 394, 403, 367

[56] References Cited

U.S. PATENT DOCUMENTS

| 1,501,773 | 7/1924 | Headley et al. | 65/244 |
| 2,952,943 | 9/1960 | Zauner | 65/296 |
| 3,202,495 | 8/1965 | Zauner | 65/294 X |
| 3,268,318 | 8/1966 | Murley | 65/277 X |
| 3,424,570 | 1/1969 | Couquelet | 65/108 X |
| 3,597,184 | 8/1971 | Pityo | 65/158 X |
| 4,330,317 | 5/1982 | Vertova | 65/292 X |

Primary Examiner—Kenneth M. Schor
Attorney, Agent, or Firm—John R. Nelson; Myron E. Click

[57] ABSTRACT

A machine for fabricating articles such as glass vials from tubular stock includes a plurality of rotating chucking stations which revolve about the central vertical axis of the machine and a plurality of tooling stations which form the vial finish. The plurality of tooling stations are disposed in euqal numbers related to the number of chucking stations on two conveyor assemblies disposed adjacent the periphery of the circle defined by the revolving chucking stations. The tooling stations each include rollers which form the outside of the vial finish and a segmented mandrel which forms the inside of the vial finish including, if desired, a blowback cavity.

24 Claims, 12 Drawing Figures

VIAL TOOLING APPARATUS

This is a continuation of application Ser. No. 248,790 filed Mar. 30, 1981 abandoned.

BACKGROUND OF THE INVENTION

The invention relates generally to machines for forming articles such as vials and containers from thermoplastic materials such as glass, and more specifically to machines for forming the vial finish, including an outside lip and an inside blowback cavity.

Machines for high volume production of small articles fabricated of thermoplastic materials such as glass vials and ampoules are both well known in the art and have achieved a high degree of sophistication. Typical of such devices are those disclosed in U.S. Pat. Nos. 3,227,539 and 3,424,570. Generally, such machines may be described as carousels having a plurality of rotating vertically aligned pairs of chucks disposed upon a revolving frame. As the frame revolves and the chucks rotate, they pass various relatively fixed stations which heat, separate and form hollow glass tube stock into vials, ampoules or other containers.

Production speed of such machines is limited by numerous considerations, not the least of which is the time that the slowest and typically most complex step in the fabrication sequence requires. Clearly, in such a sequential machine, the most time consuming step dictates the production speed. In the production of glass vials which may include a finish having an outside lip and an inside blowback cavity, the tooling steps which form this finish generally represent this most complex and slowest step. It is therefore desirable to increase the speed with which the vial finish is tooled in order to increase the overall speed of the machine and the production rate thereof.

One scheme directed toward increasing the production speed of such a glass vial machine is disclosed in U.S. Pat. No. 3,730,699. This patent discloses a machine for working articles of thermoplastic materials wherein a pair of carriages support endless conveyors having tools which are moved into and out of engagement with stock disposed within the rotating chucks of a vertical glass vial machine to accomplish tooling of the finish of the article. A suggestion is made that three or four tools are preferably utilized on each carriage assembly. It has been found, however, that increased numbers of tooling stations provides a corresponding increase in cooling time of the finish tooling components which provides improved performance. Further, the device disclosed in this patent provides only a uniform inside diameter wall finish. It is common practice to include an outwardly directed re-entrant portion or blowback cavity on the inside wall of the vial finish. The device of the subject patent would appear to be incapable of producing such a configuration.

SUMMARY OF THE INVENTION

A machine for fabricating thermoplastic stock into small articles such as vials or other containers comprises a plurality of pairs of upper and lower rotating chucking stations, typically 36 pairs, which are disposed generally about the periphery of a circular frame which rotates about a central vertical axis. The upper chucking stations receive and retain lengths of hollow stock such as glass tubes. Various heating, separation and forming stations transform the glass stock into containers which exit the machine through the lower chucking stations. The various heating, forming and chucking operations are performed such that a sealed end or a finish is fabricated in 180° of rotation of the main machine frame and a complete article is fabricated in 360° of rotation. Thus, each operation is performed every 180° and pairs of stations performing identical functions may be found disposed in diametrically opposed locations about the machine.

Such a diametrically opposed pair of devices are the tooling station assemblies of the instant invention. Each of the tooling station assemblies includes a conveyor assembly having a plurality of, for example, nine such tooling stations secured to a moving chain and circulating about the conveyor assembly. Each of the tooling stations includes upper and lower idler wheels which engage the rotating peripheral surfaces of collars on the pairs of upper and lower chucks of the machine and accurately align themselves therewith. A horizontally extending cam and cooperating roller secured to each of the tooling stations drives them vertically into proximity with the finish of the glass vials which are secured within the rotating upper chucking stations. The operative components of the tooling stations include a pair of cam operated forming rollers and mandrel segments. When axially aligned with the vial finish, the forming rollers translate toward one another and engage the outside of the vial finish while the mandrel segments expand to form the inside of the vial finish and a blowback cavity if desired. Subsequent to the completion of the tooling process, the forming rollers move away from one another and the completed vial finish, the mandrel segments collapse and the entire tooling station descends vertically away from the vial finish.

A vial machine according to the instant invention will preferably include 36 pairs of vertically aligned rotating chucking stations or 18 on a given half or 180° of the machine. It has been found beneficial to relate the number of tooling stations to the number of rotating chuck assemblies in order to ensure optimum performance. In this regard, the utilization of nine tooling stations per conveyor assembly ensures that each tooling station will repeatedly and only engage and function with the same four pairs of rotating chucks. Furthermore, it has been found that this number of tooling stations provides increased cooling time for the tooling between each tooling sequence which also improves machine performance and the quality of the final product.

Thus, it is the object of the instant invention to provide a machine for the fabrication of articles from thermoplastic stock such as glass vials and containers.

It is a further object of the instant invention to provide a vertical glass vial machine having a pair of diametrically opposed conveyors having a plurality of circulating tooling stations.

It is a still further object of the instant invention to provide a vertical glass vial machine having pairs of vertically aligned rotating chucks and circulating tooling stations disposed on peripheral conveyors exhibiting a ratio of pairs of chucking stations to tooling stations of 2:1.

It is a still further object of the instant invention to provide a vertical vial machine having tooling stations which form both a lip on the outside surface of the vial finish and a blowback cavity on the inside surface of the vial finish.

It is a still further object of the instant invention to provide a vertical glass vial machine having tooling stations circulating on diametrically opposed conveyors, wherein each tooling station has a pair of pivotally mounted forming rollers and a segmented expandable mandrel.

Further objects and advantages of the instant invention will become apparent by reference to the following description and appended drawings.

DESCRIPTION OF THE PREFERRED EMBODIMENT

Figure 1:
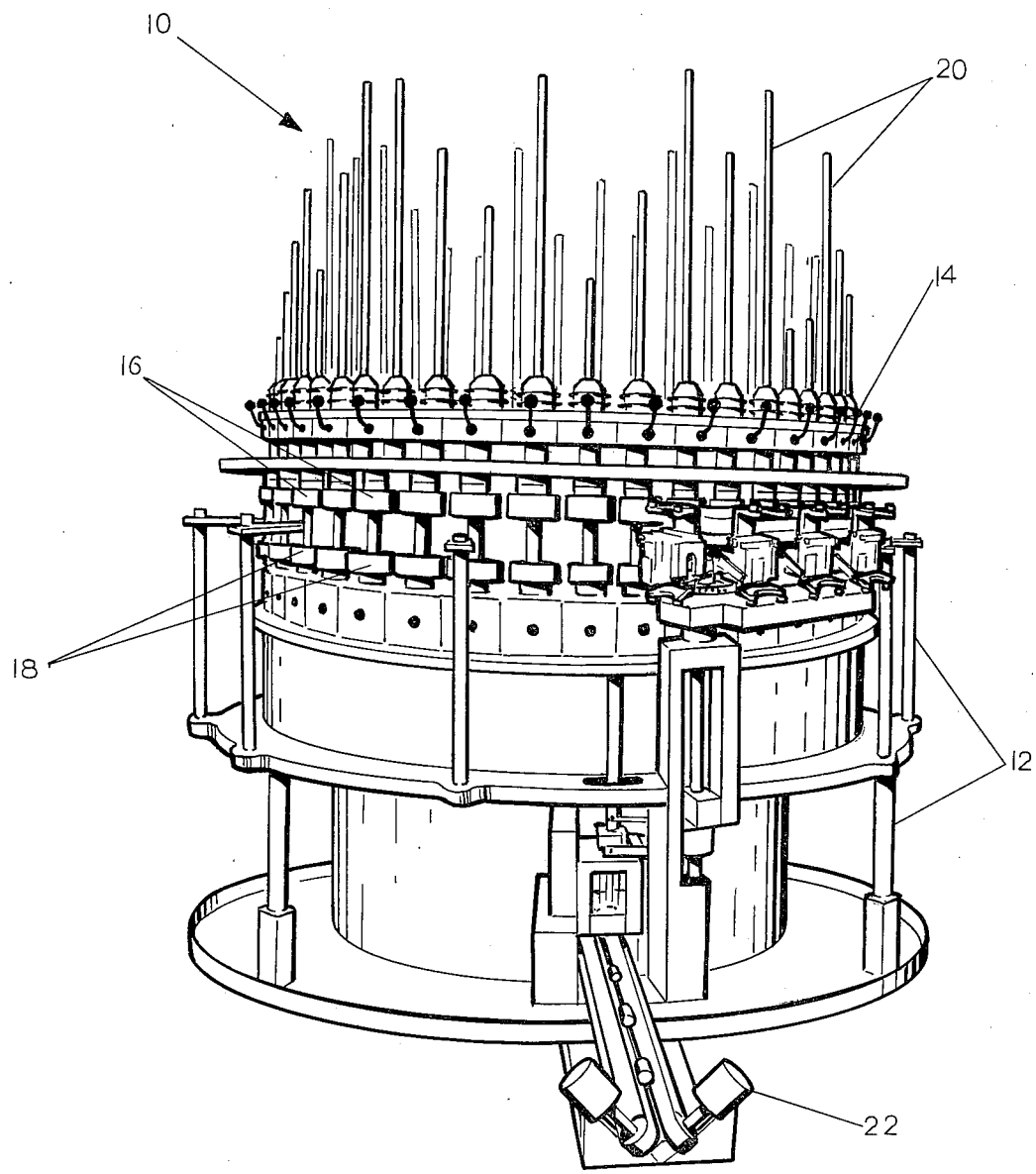
FIG. 1 is a perspective view of a vertical glass vial machine according to the instant invention.

Referring now to FIG. 1, a vertical vial machine incorporating the instant invention is generally designated by the reference numeral 10. The machine 10 includes a circular frame 12 which supports a centrally disposed carousel 14 which is secured for rotation about a vertical axis. The carousel 14 includes a plurality of upper and lower chucking assemblies 16 and 18, respectively, which are disposed in vertically aligned pairs. Each of the upper chucking assemblies 16 receives a length of stock such as glass tubes 20 from which articles are fabricated. Although the number of pairs of chucking assemblies 16 and 18 may vary, such machines 10 typically include 36 such pairs. For purposes of example and illustration, this number of pairs of chucking assemblies 16 and 18 will be utilized. It should be appreciated, however, that greater or lesser numbers of pairs of assemblies 16 and 18 may be utilized to practice the instant invention. A pair of dual belt conveyor assemblies 22 discharge finished articles from the machine 10.

Figure 2:
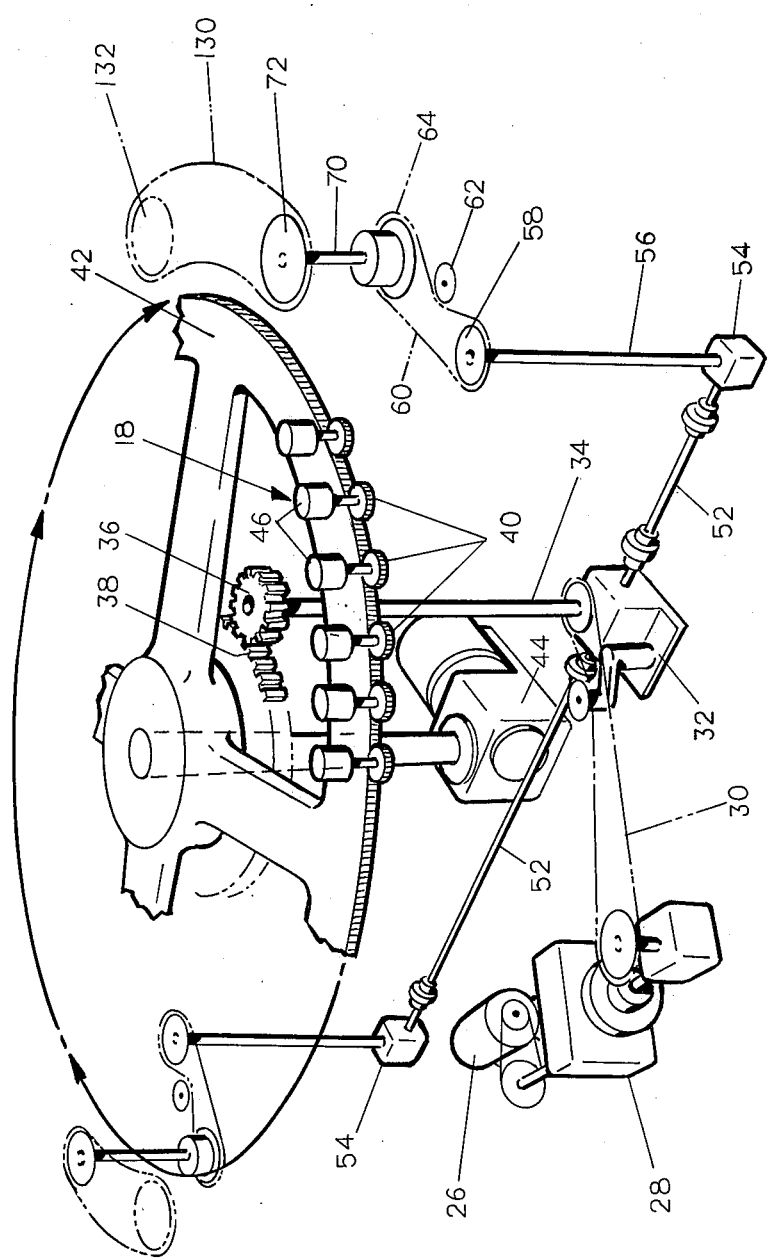
FIG. 2 is a diagrammatic view of the drive components of the vertical glass vial machine according to the instant invention.
Figure 3:
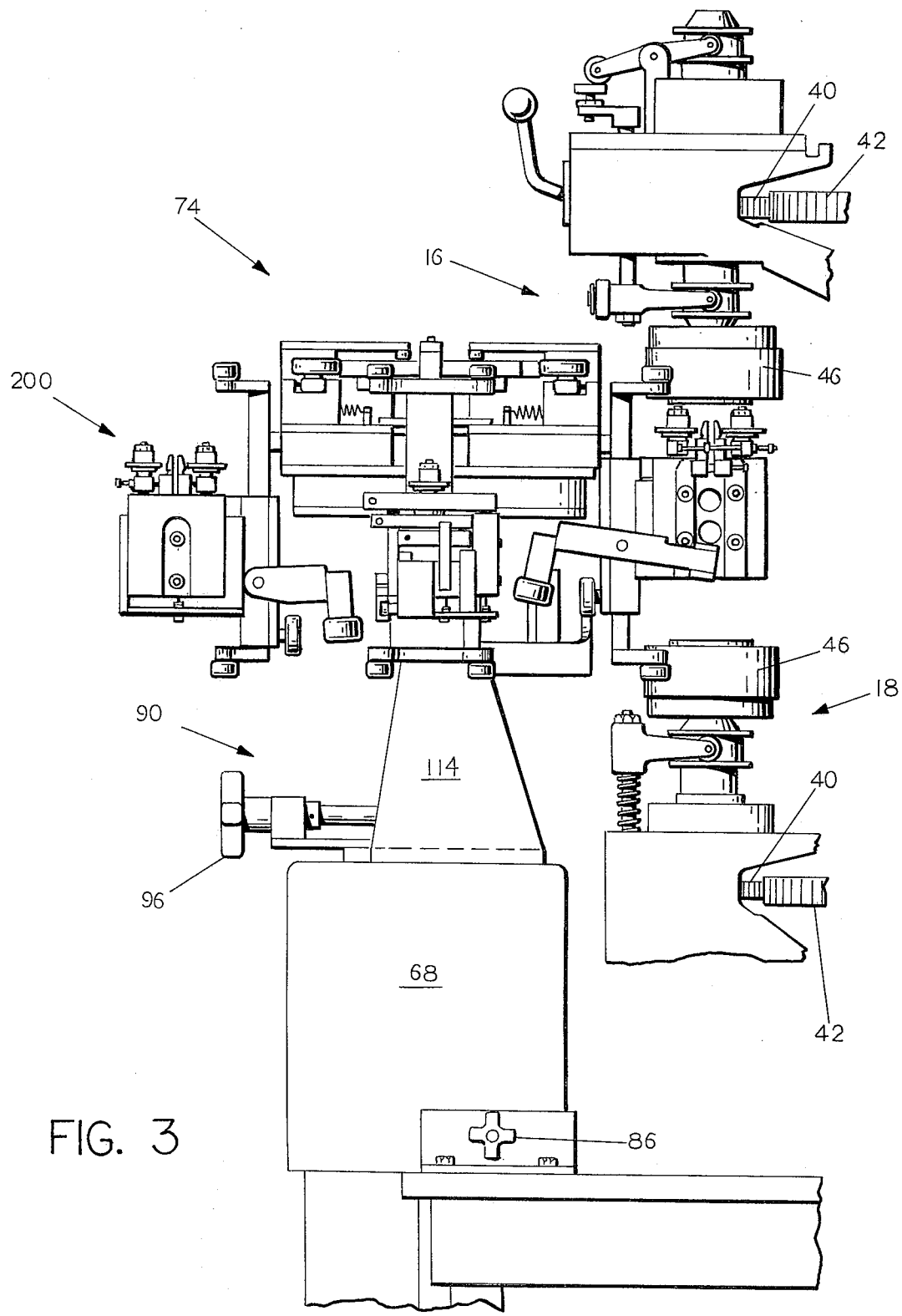
FIG. 3 is a fragmentary side elevational view of a pair of vertically aligned chucking stations and one of a pair of tooling station assemblies of a vertical glass vial machine according to the instant invention.

Referring now to FIGS. 1, 2 and 3, the carousel 14 is rotated by a suitable drive assembly 24 including, for example, an electric motor 26, a speed reduction unit 28, a power transfer means such as a chain or belt 30 and a power distribution gearbox 32. The power distribution gear box 32 includes a vertically oriented shaft 34 having a pinion gear 36 disposed adjacent its upper terminus. The pinion gear 36 drives a spur gear 38 secured to the carousel 14. Activation of the drive assembly 24 thus causes rotation of the carousel 14. Each upper chucking assembly 16 and lower chucking assembly 18 which constitute a pair, are coaxially aligned for rotation about a vertical axis and includes pinion gears 40 which engage a respective one of a pair of upper and lower rotating spur gears 42. The spur gears 42 are driven by a variable speed drive assembly 44. Rotation of the carousel 14 causes synchronous rotation of each of the pairs of upper and lower chucking assemblies 16 and 18, the speed of rotation being adjustable, relative to the rotation of the carousel, by the drive assembly 44. Each of the upper and lower chucking assemblies 16 and 18 includes a smooth walled collar 46 secured for rotation therewith and disposed concentrically thereabout. Various stationary heating and camming components (not illustrated) are disposed about the machine frame 12 and, as the upper and lower chucking assemblies 16 and 18 rotate and revolve about the center of the carousel 14, the glass tubes 20 are heated, severed and tooled into a desired article, such as a glass vial, which is discharged from the machine by one of the conveyor assemblies 22. As has been stated, the fabrication of an end or a finish is accomplished in 180° of rotation of the carousel 14; a complete article is fabricated in 360° of rotation. In order to maximize production, the end of one article and the finish of another may be simultaneously fabricated at 180° of rotation and to accomplish this substantially all heating and fabrication stations are disposed on the machine 10 in diametrically opposed pairs.

Figure 4:
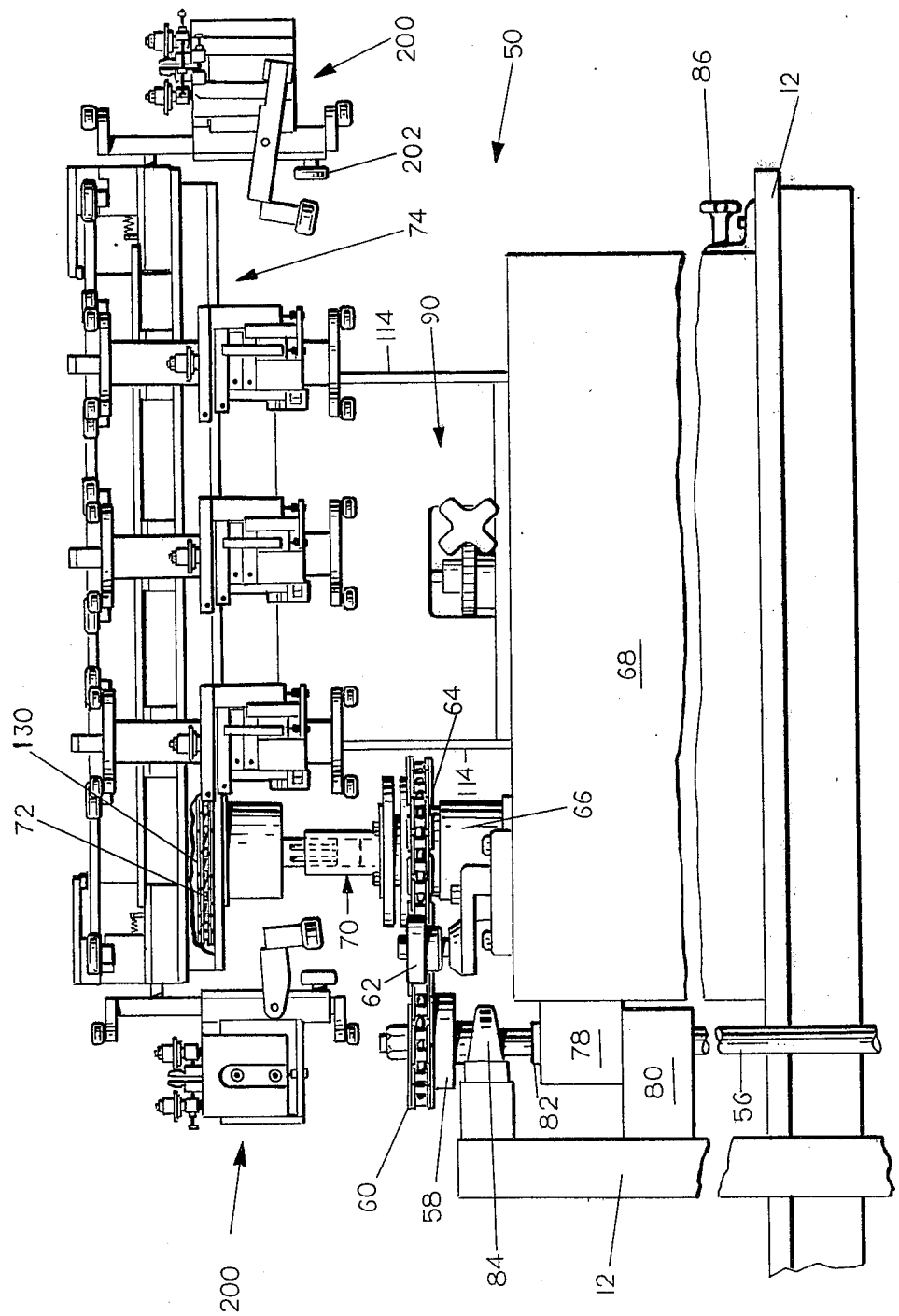
FIG. 4 is a side elevational view of one of the two tooling station assemblies.

Referring now to FIGS. 1, 2 and 4, the vial machine 10 includes a pair of diametrically opposed tooling station assemblies 50. Rotational energy is supplied to the tooling assemblies 50 by means of suitable shafts 52 extending from the power distribution gear box 32, a pair of right angle drives 54 and a like pair of vertically oriented shafts 56. Each of the vertical shafts 56 terminates in a sprocket 58 having a chain 60 disposed thereabout. An idler wheel 62 provides proper tension to the chain 60 which is disposed about and transfers power to a chain sprocket 64. The sprocket 64 is disposed for rotation in a suitable bearing 66 which is secured to a frame 68 of the tooling station assembly 50. Secured for rotation to the sprocket 64 is one element of a spline assembly 70 which transfers rotational energy to the other element of the spline assembly 70 and thence to a drive sprocket 72 disposed within a conveyor assembly 74 while permitting adjustment of the vertical height of the conveyor assembly 74 relative to the frame 68 in a manner to be more fully described subsequently.

The frame 68 as well as the conveyor assembly 74 is pivotally secured to the frame 12 of the machine 10 in order that it may be moved away therefrom in order to facilitate adjustment and service of the various components mounted thereon. The vertical shaft 56 extends through staggered, axially aligned supports 78 and 80 extending from the frames 68 and 12, respectively. Shaft 56 is preferably disposed within suitable bushings 82 secured within the supports 78 and 80 and is accurately rotationally positioned in an anti-friction bearing pillow block 84 which is also secured to the machine frame 12. The shaft 56 thus functions as a hinge pin about which the tooling station assembly 50 may be pivoted as previously described. Latch means such as a threaded retaining pin 86 extending from the frame 12 into the frame 68 may be utilized to restrain the pivoting tooling station assembly 50 in its operating position adjacent the path of the upper and lower chucking assemblies 16 and 18, respectively, as illustrated in FIG. 3.

Figure 5:
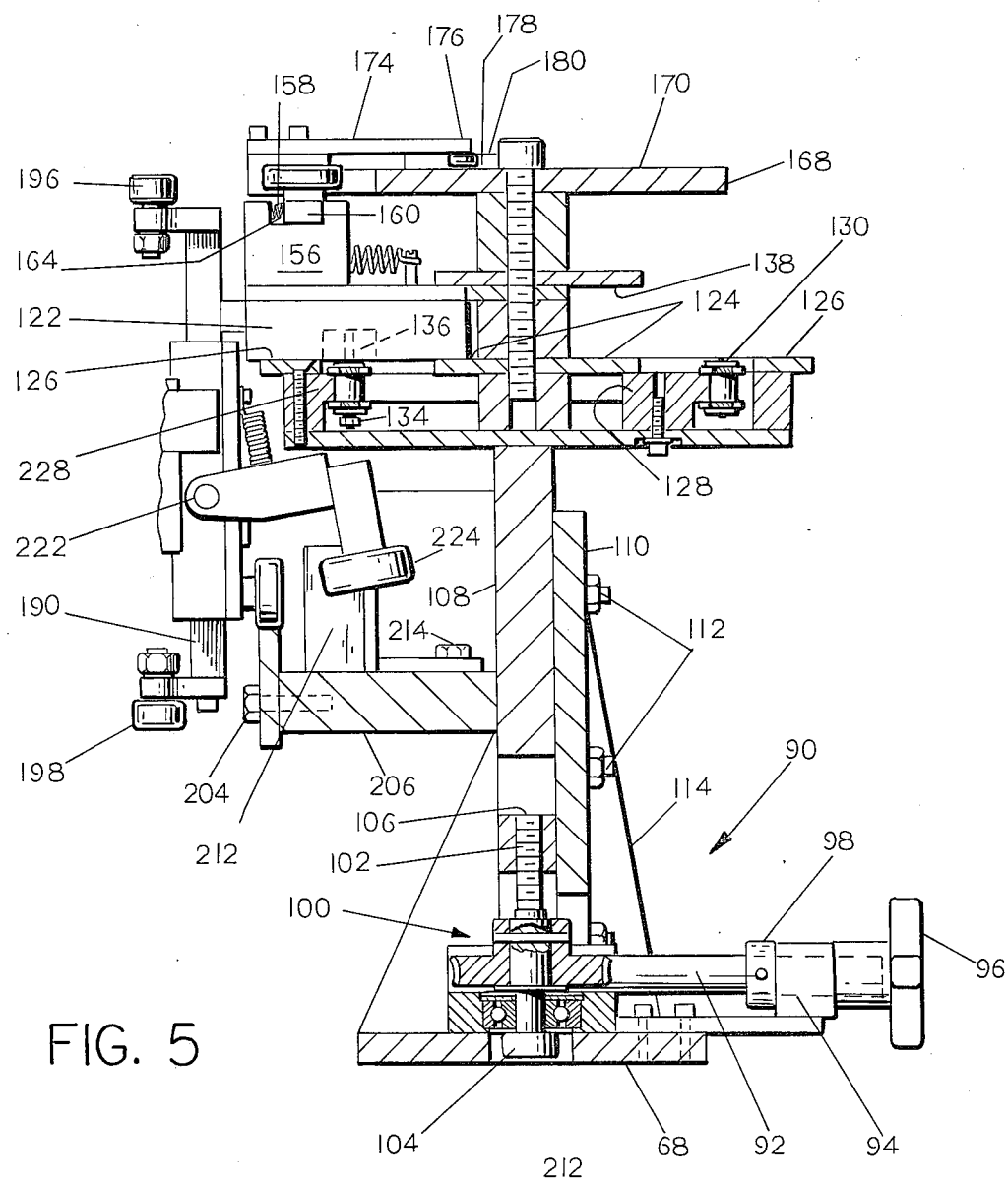
FIG. 5 is a fragmentary sectional view of one of the two tooling station assemblies.

Referring now to FIGS. 4 and 5, vertical adjustment of the conveyor assembly 74 is achieved by an adjustment mechanism 90. The adjustment mechanism 90 includes a horizontally disposed shaft 92 which extends through a suitable bushing 94 which is operably secured to the frame 68. A hand wheel 96 is fixedly secured to the terminus of the shaft 92 and a restraining collar 98 maintains the shaft 92 in fixed axial position relative to the bushing 94. A worm drive assembly 100 transfers rotation of the shaft 92 to a vertically oriented threaded stud 102. A threaded stud is preferably supported by suitable anti-friction bearings 104. The threaded portion of the stud 102 is disposed within a complementarily threaded blind opening 106 defined in a vertically oriented plate 108. The plate 108 is restrained to slide vertically along a parallel support plate 110 by selectively securable fasteners 112 and is restrained from lateral motion by the fasteners 112 as well as trapezoidal support plates 114. Rotation of the handwheel 96 thus causes rotation of the elements of the worm drive assembly 100, rotation of the threaded stud 102 and ascension or descension of the conveyor assembly 74. In this regard, it should be noted that the spline assembly 70 maintains power transfer to the conveyor assembly 74 over the range of vertical travel provided by the adjustment mechanism 90.

Figure 6:
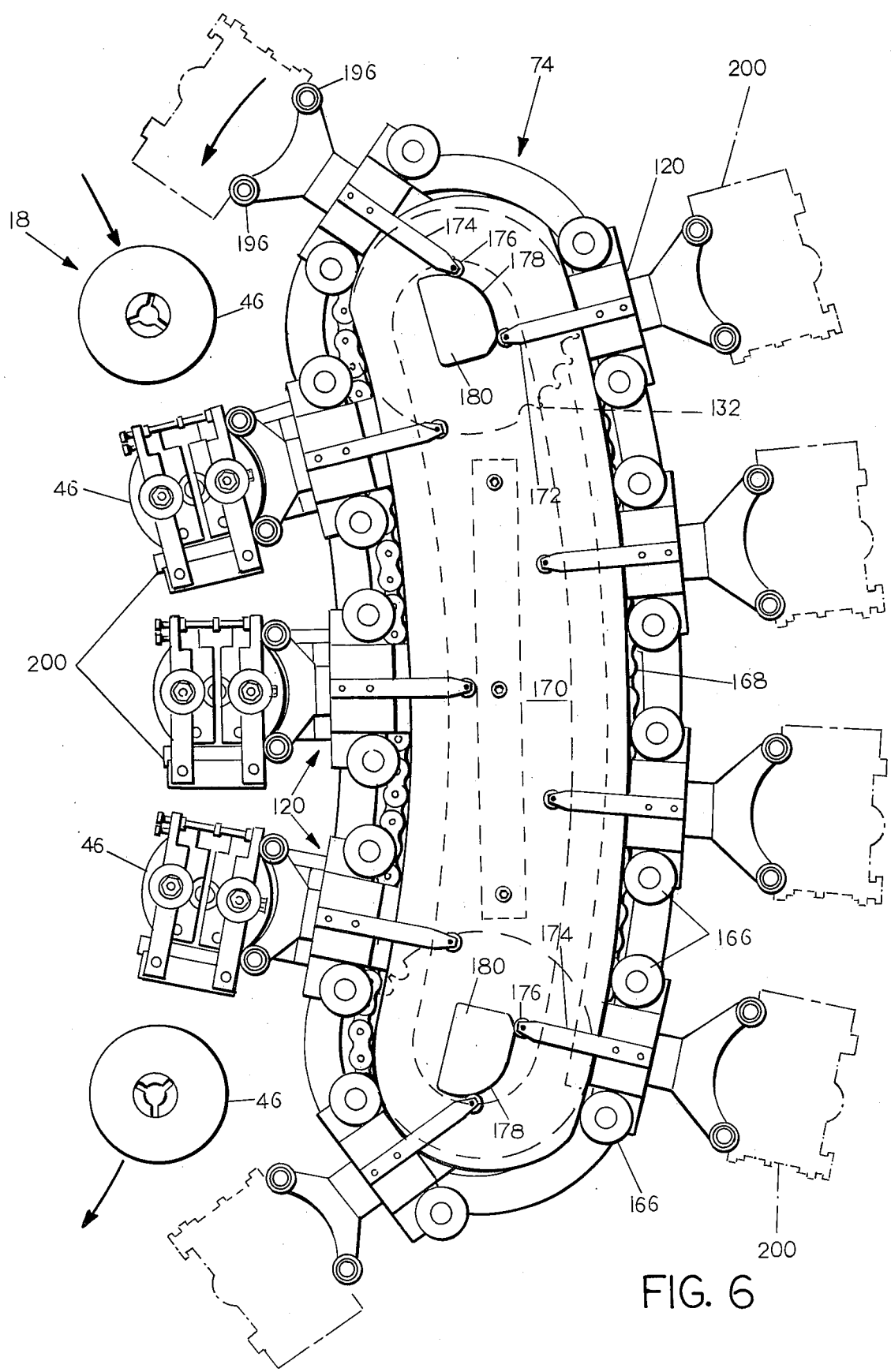
FIG. 6 is a top plan view of one of the two tooling station assemblies.
Figure 8:
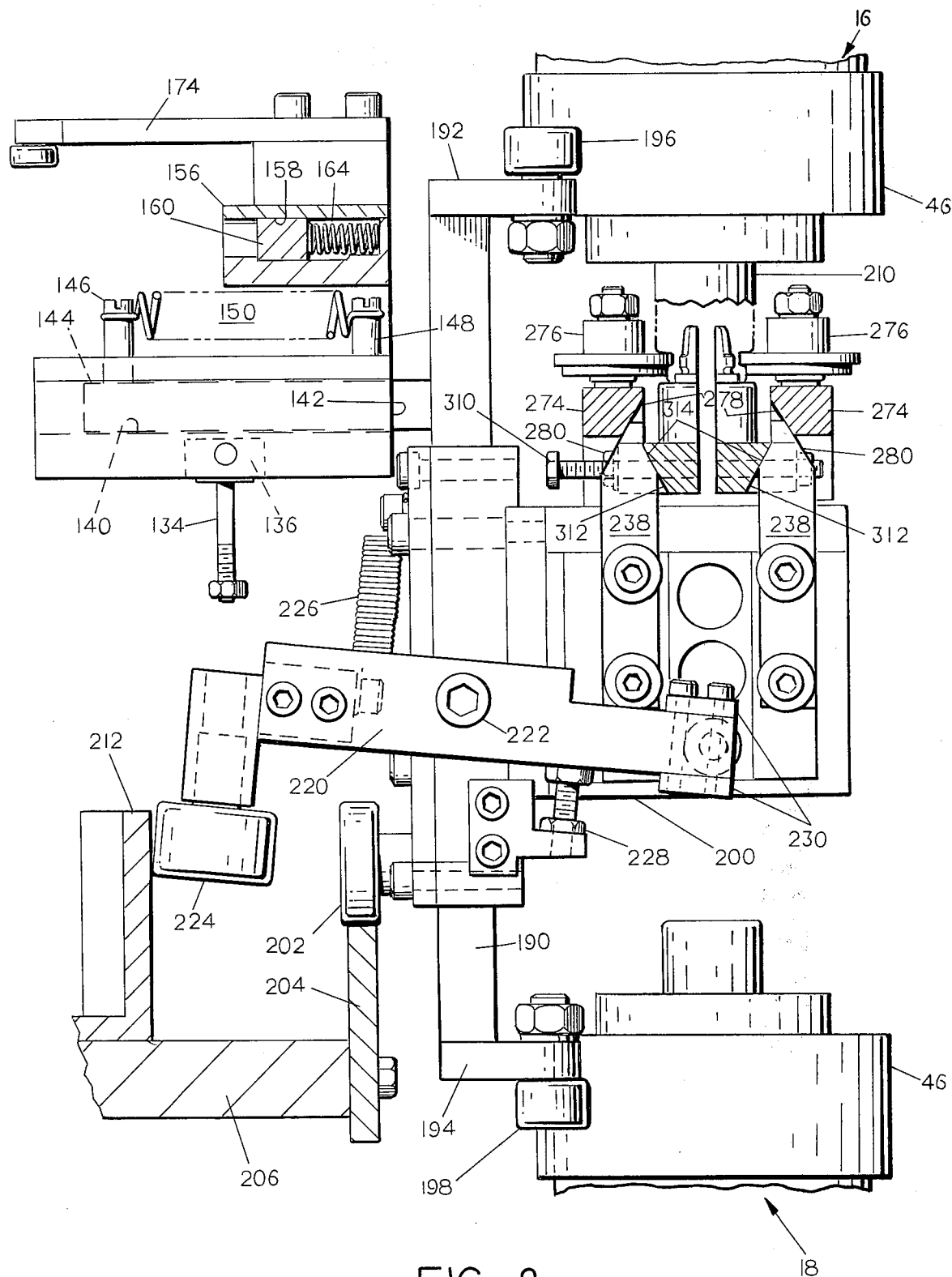
FIG. 8 is a side elevational view of a tooling station carriage according to the instant invention.

Referring now to FIGS. 5, 6 and 8, the conveyor assembly 74 supports a plurality of tooling carriages 120 which circulate in a controlled path about its periphery. As has been stated previously, the number of tooling carriages 120 is preferably related to the number of pairs of chucking station assemblies 16 and 18. It has been found advantageous to utilize nine tooling carriages 120 on each of the two tooling station assemblies 50 on a vertical vial machine having 36 pairs of chucking station assemblies 16 and 18. Each of the tooling carriages 120 includes a generally rectangular bearing block 122 which rests upon and circulates about an inner bearing surface 124 and an outer bearing surface 126 which forms a portion of the conveyor assembly 74. Convex chain guides 128 positioned between the bearing surfaces 124 and 126 guide the drive chain 130 from the drive sprocket 72 disposed at one end of the conveyor assembly 74 to an idler sprocket 132 rotatably disposed within the conveyor assembly 74 at its opposite end. The drive chain 130 is a hollow pin chain and through suitable spaced-apart hollow pins are disposed suitable fasteners such as a bolt 134. The bolt 134 extends into a bearing such as an anti-friction bearing 136 and thus provides a reduced rotational friction connection between the bearing block 122 of the tooling carriage 120 and the drive chain 130. The conveyor assembly 74 further includes an upper bearing plate 138 which restrains the bearing block 122 against vertical motion away from the bearing surfaces 124 and 126 as well as minimizing transverse forces on the drive chain 130. The bearing block 122 defines a preferably rectangular passageway 140 which functions as a linear journal bearing for a horizontally extending slide 142. The bearing block 122 also defines a slot 144 having its long axis disposed parallel to the axis of translation of the slide 142 within the passageway 140. Disposed within the slot 144 and secured to the slide 142 is a spring retention post 146. A second spring retention post 148 is secured to the bearing block 122 at the opposite end of the elongated slot 144. A tension spring 150 extends between the spring retention posts 146 and 148 and biases the slide 142 and various associated components away from the central portion of the conveyor assembly 74.

Referring now to FIGS. 5, 6, 7 and 8, a guide block 156 is disposed above and secured to the bearing block 122. In addition to providing clearance for the tension spring 150, the guide block 156 defines a through, generally rectangular passageway 158 within which a rectangular, horizontally extending bar 160 is disposed. Positioned within suitable spring retaining recesses 162 in the block 158 are a pair of compression springs 164 which bias the bar 160 and a pair of rollers 166 disposed at each end of the bar towards the center of the conveyor assembly 74. During a portion of the circulation of the tooling station 120 about about the conveyor assembly 74, the rollers 166 engage a vertical surface 168 on the topmost plate 170 of the conveyor assembly 74 and guide the tooling carriages 120 about the conveyor assembly 74. To the uppermost surface of the guide block 156 is secured a guide arm 174. At the inward, terminal portion of the guide arm 174 is secured a roller or cam follower 176. A cam follower 176 contacts a vertically oriented surface 178 on a pair of irregularly shaped cams 180 secured to the topmost plates 178 of the conveyor assembly 74 at locations generally equidistant from the sides and ends thereof. The vertical surfaces 178 of the irregular cams 180 cooperate with the followers 176 to guide and direct the positions of the tooling carriages 120 as they circulate about the conveyor assembly 74 adjacent its end regions. Such guidance, by the irregular cams 180 ensures positive engagement of the collars 46 on the chucking stations 16 and 18 by the tooling carriages 120.

Figure 7:
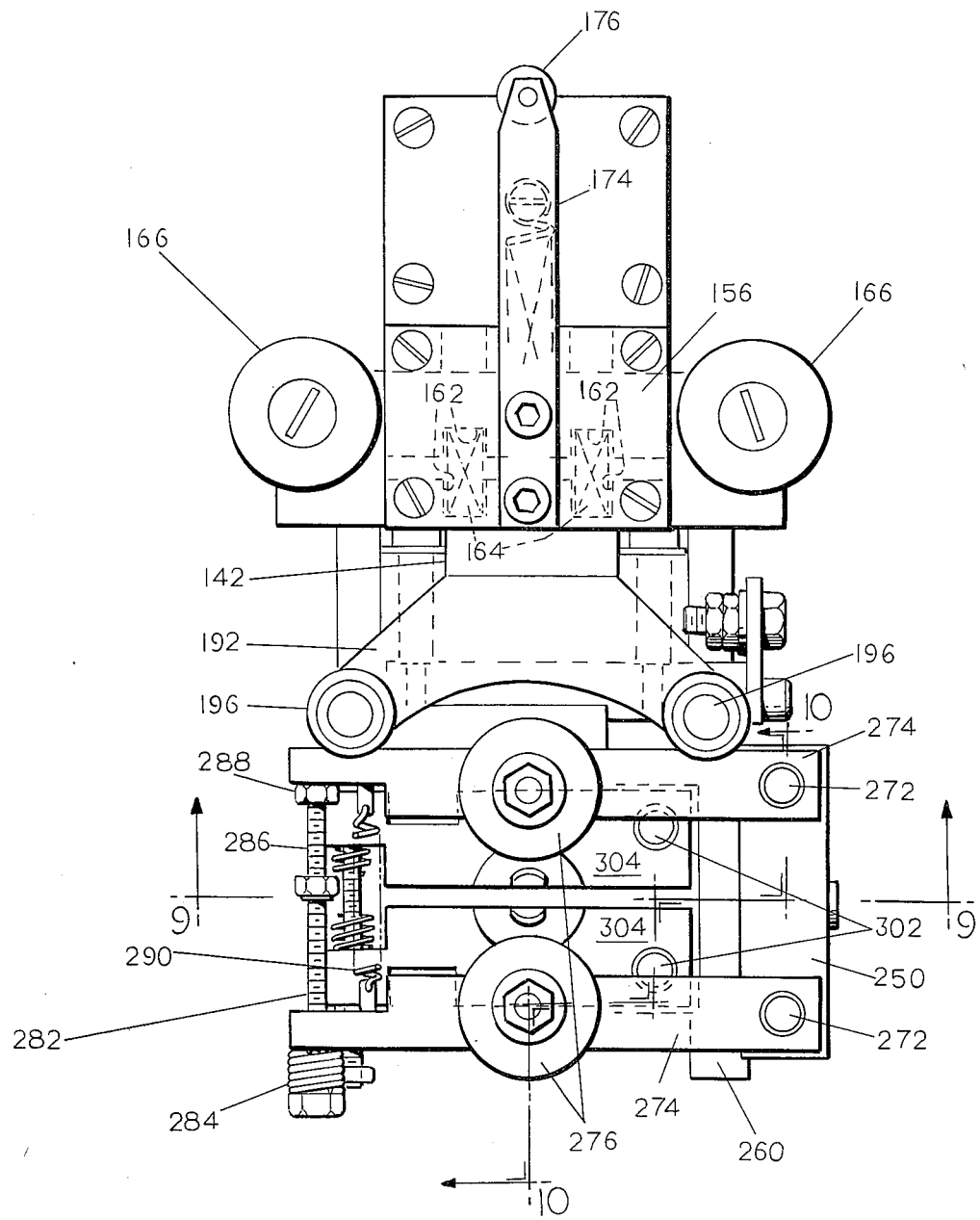
FIG. 7 is a top plan view of a tooling station carriage according to the instant invention.

Referring now to FIGS. 5, 7 and 8, the horizontally extending slide 142 perpendicularly abuts and is secured to a vertically oriented bar 190. To the upper and lower termini of the vertically oriented bar 190 is secured a pair of upper and lower yokes 192 and 194, respectively. Each of the upper and lower yokes 192 and 194 includes a pair of rollers 196 and 198, respectively, disposed for rotation about parallel, spaced-apart vertical axes. The pair of rollers 196 disposed upon the upper yoke 192 accurately positions the upper portion of the vertical bar 190 relative to the upper chucking assembly 16 by virtue of juxtaposition to and rolling engagement with the collar 46 secured about the upper rotating chucking assembly 16 and the pair of rollers 198 disposed below the lower yoke 194 accurately positions the lower portion of the vertical bar 190 relative to the lower chucking assembly 18 by virtue of juxtaposition to and rolling engagement with the collar 46 disposed about the lower chucking assembly 18. The position of the tooling carriage 120 is thus determined by and accurately referenced, from both above and below, to the position of a pair of upper and lower chucking assemblies 16 and 18, respectively.

Figure 5A:
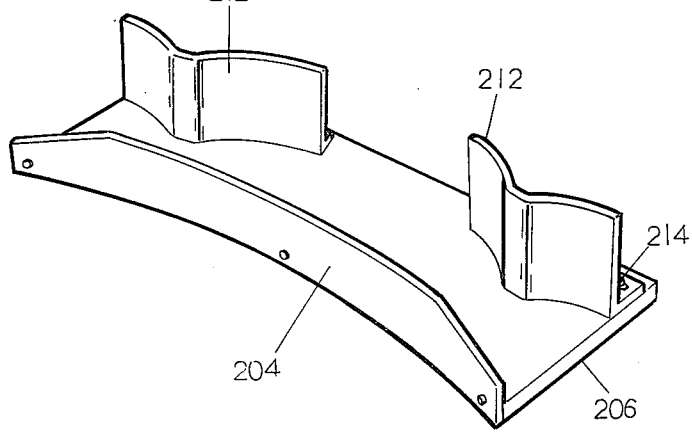
FIG. 5A is a fragmentary perspective view of the tooling station activating cams.

Referring now to FIGS. 5, 5A and 8, the vertical bar 190 of the tooling carriage 120 slidably mounts a tooling station 200. The tooling station 200 includes a cam follower 202 rotatably secured thereto and disposed generally below the bearing block 122. During a portion of the circulation of the carriage assembly 120 about the conveyor assembly 74, the cam follower 202 engages a cam plate 204 secured by suitable support structure 206 to the exposed inner face of the vertical plate 108. The cam plate 204 vertically translates the tooling station 200 along the vertical bar 190 from a position substantially coincident with the lowermost portion of the vertical bar 190 such as illustrated in FIG. 4 upward to the position illustrated in FIG. 8 at which the tooling station 200 may accomplish the tooling of a glass vial 210 secured for rotation within one of the upper chucking assemblies 16. The support structure 206 also provides mounting for a pair of horizontally oriented cams 212. The cams 212 are secured to the support structure 206 by means such as the threaded fasteners 214 which provide lateral adjustment thereof. The function of the pair of cams 212 will be described subsequently.

A yoke structure 220 is pivotally secured to the portion of the tooling station 200 proximate the vertical bar 190 by suitable pivot pins 222. A cam follower 224 is secured for rotation about an axis perpendicular to the plane of the yoke structure 200 to the end of the yoke 220 opposite the tooling station 200. A tension spring 226 secured between the tooling station 200 and the end of the yoke 220 to which the cam follower 224 is secured provides restoring force to the yoke 220 in a clockwise direction as viewed in FIG. 8. Clockwise travel of the yoke 222 is limited and adjusted by an adjustable stop 228 which may comprise a conventional machine bolt disposed within a suitably threaded passage and a lock nut. The rear portion of the yoke 220 is truncated as is illustrated in FIG. 5 whereas the front portion of the yoke 220 illusrated in FIG. 8 is terminated by a pair of parallel upper and lower bearing plates 230.

Figure 9:
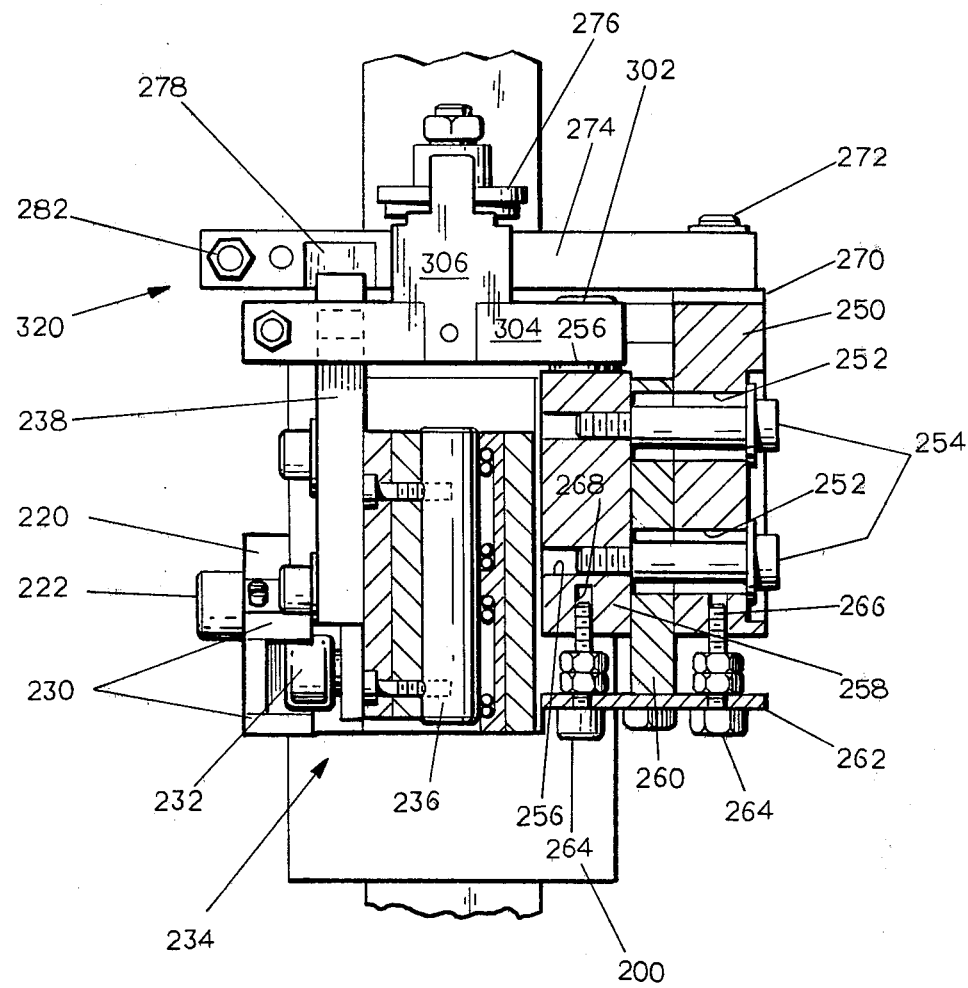
FIG. 9 is a full sectional view of a tooling tation according to the instant invention taken along line 9—9 of FIG. 7.

Referring now to FIGS. 8 and 9, the bearing plates 230 at the end of the yoke 220 engage a roller 232 which is secured to a slide assembly 234. The slide assembly 234 is constrained for reduced friction translation along vertical axes by means of a pair of linear ball bearings 236 which are generally aligned behind a pair of dual cam members 238. The dual cam members 238 thus translate vertically in response to engagement of the cam follower 224 with either of the pair of cams 212.

Figure 10:
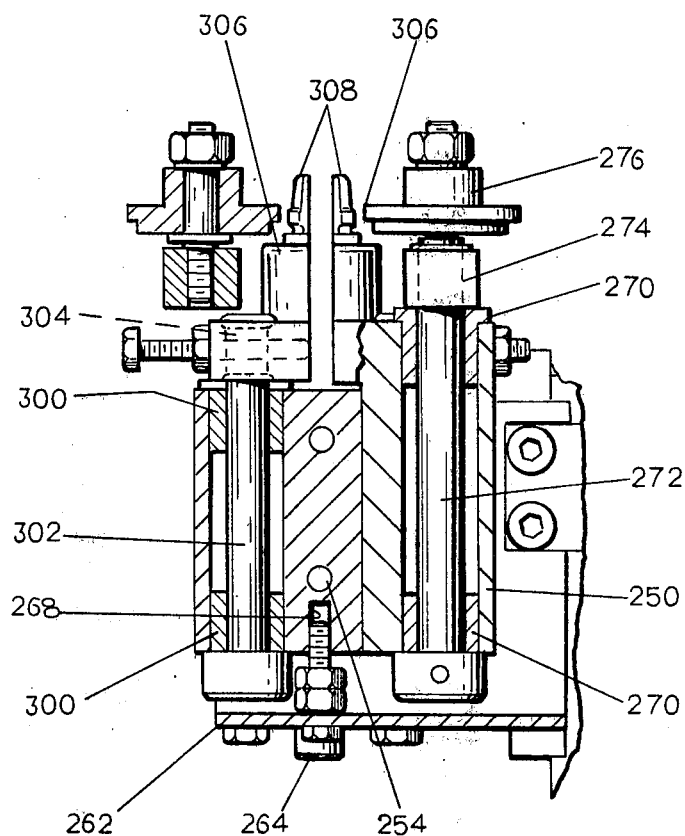
FIG. 10 is a full sectional view of a tooling station according to the instant invention taken along line 10—10 of FIG. 7.

Referring to FIGS. 9 and 10, the tooling station 200 includes a first adjustable mounting block 250 having suitable enlarged openings 252 though which threaded fasteners 254 may freely pass. The threaded fasteners 254 seat within complementarily threaded openings 256 defined by a second adjustable mounting block 258. Sandwiched between the first and second mounting blocks 250 and 258 is a relatively fixed plate 260 which forms a portion of the body of the tooling station 200 and to which a horizontally disposed plate 262 is secured. On opposite sides of the vertical, fixed plate 260 and axially restrained in the horizontal plate 262 are a pair of rotatable threaded adjustment screws 264 and which seat in complementarily threaded passageways 266 and 268 in the mounting blocks 250 and 258, respectively. When the threaded fasteners 254 are loosened, each of the screws 264 provide accurate independent adjustment of the vertical position of the adjustable mounting blocks 250 and 258, respectively.

Referring now to FIGS. 7, 8, 9, and 10, the first vertically adjustable mounting block 250 includes a pair of spaced-apart bushing sets 270 which rotatably position and support a pair of parallel, spaced-apart pivot pins 272. To each of the pivot pins 272 is secured one of a pair of pivot arms 274. At approximately the midpoints of the lever arms 274 are rotatably secured a respective pair of forming rollers 276. Disposed between the forming rollers 276 and the termini of the lever arms 274 most distant the pivot pins 272 are a pair of symmetrically oriented oblique camming surfaces 278. The pair of camming surfaces 278 are aligned and cooperate with complementary oblique camming surfaces 280 defined by the upper portions of the pair of dual cam members 238. As the dual cam members 238 translate vertically upwardly, the lever arms 274 and thus the forming rollers 276 disposed thereon separate and vice versa. The minimum center to center separation of the forming rollers 276 may be adjusted by an adjustment screw 282 threadably secured adjacent the end of one of the lever arms 274 and restrained against, for example, vibration induced rotation by an expansion spring 284. A similarly threaded stop 286 having appropriate lock nuts 288 is aligned with the adjustment screw 282. A tension spring 290 secured between the termini of the lever arms 274 opposite the pivot pins 272 provides a biasing force to ensure that the lever arms 274 and the forming rollers 276 translate toward one another in response to downward translation of the dual cam members 238.

Referring now to FIGS. 7, 9 and 10, the second adjustable mounting block 258 includes a pair of spaced-apart bushing sets 300 which rotatably position and support a pair of parallel, spaced-apart pivot pins 302. To the upper termini of the pivot pins 302 is secured one of a pair of horizontal, spaced-apart lever arms 304. Secured to each of the lever arms 304 at substantially its horizontal midpoint is one of a respective pair of symmetrical semi-cylindrical mandrel segments 306. Each of the mandrel segments 306 preferably includes a radially outwardly extending lip or projection 308 which may be utilized to form a blowback cavity in the finish of the vial 210. The mandrel segments 306 are removably secured to the lever arms 304 by fastener means such as the threaded fasteners 310. Preferably, one of the fasteners 310 is of extended length which facilitates access thereto in view of the limited space in which it is situated adjacent the vertical bar 190 (see FIG. 8).

Figure 11:
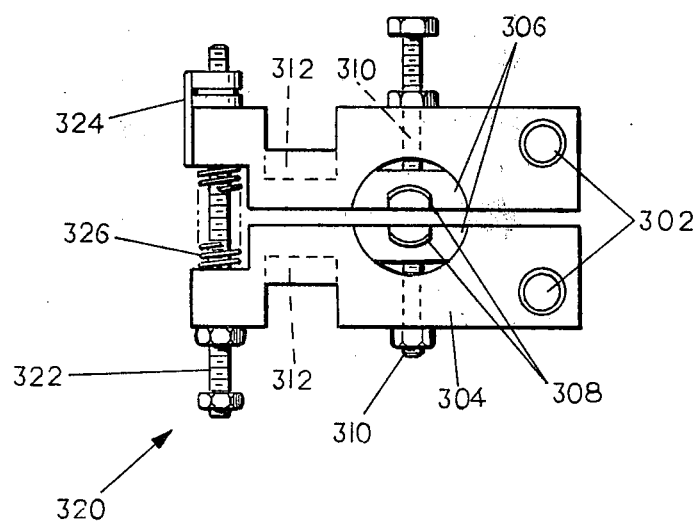
FIG. 11 is a fragmentary, top plan view of the mandrel adjustment means of a tooling station according to the instant invention.

Referring now to FIGS. 8 and 11, the lever arms 304 each define a respective one of a pair of obliquely oriented cam surfaces 312 which are parallel to and coact with complementarily disposed oblique camming surfaces 314 on the dual cam members 238. As is apparent by reference to FIG. 8, upward vertical translation of the dual cam members 238 translates the mandrel segments 306 toward one another and vice versa. The terminal portions of the lever arms 304 most distant the pivot pins 302 include an adjustment mechanism 320. The adjustment mechanism 320 includes a threaded member 322 extending between the respective lever arms 304 which is free to slide within at least one of the lever arms 304. The threaded member 322 includes suitable adjustable locking means 324 disposed thereon. A compression spring 326 coaxially disposed about the threaded member 322 ensures that the mandrel segments 306 translate laterally away from one another to the maximum extent allowed by the adjustment mechanism 320 when the cooperating oblique cam surfaces 312 and 314 so allow.

The operation of the tooling station assembly 50 will now be described with reference to FIGS. 6 through 11. As had been previously stated, the upper and lower chucking assemblies 16 and 18, respectively rotate on their respective vertical, parallel, spaced-apart axes and revolve about the center of the carousel 14. The conveyor assembly 74 supports and drives the nine tooling carriages 120 on each of the two tooling station assemblies 50 such that the linear rate of travel of the chucking assemblies 14 and 16 and the carriage assemblies 120 is equal as they engage one another and translate along a common arc over a portion of their travel. It should be apparent that the carriage assemblies 120 are relatively loosely pivotally secured to the drive chain 72 and thus the tooling stations 200 supported on the tooling carriages 120 may be and are accurately positioned relative to the upper and lower chucking assemblies 16 and 18, respectively, by rotating engagement of the upper and lower pairs of rollers 196 and 198, respectively, with the collars 46 associated with the chucking assemblies 16 and 18. As engagement between the tooling carriages 120 and chucking assemblies 16 and 18 is achieved, the cam follower 224 engages the first of the pair of cams 212 which pivots the yoke 220, vertically translates the dual cam members 238, translates the forming rollers 276 away from one another and collapses the mandrel segments 306. Substantially simultaneously, the cam follower 202 engages the cam 204 which drives the tooling station 200 vertically, upwardly, into an appropriate position for tooling the finish of the glass vial 210 secured in the upper chucking assembly 16. As the chucking assemblies 16 and 18 and the tooling carriages 120 continue to translate along the common arc, the first of the pair of cams 212 falls and the cam follower 224, the yoke 220, the dual cam members 238, the forming rollers 276 and the mandrel segments 306 relax and return to the positions illustrated in FIG. 8. In these positions, the forming rollers 276 tool the external finish of the vial 210 and the mandrel segments 306, including the projections 308, tool the inside finish of the vial 210 including the formation of a blowback cavity, if desired. It should be understood that the precise profile of the finish of the vial 210 may be modified by appropriate changes in the profiles of the rollers 276 and the segmented mandrels 306 in order to achieve a desired finish. Upon completion of the tooling of the vial 210, the chucking assemblies 16 and 18 and the tooling carriage 120 continue to briefly travel colinearly. The components of the tooling station 200 are withdrawn from the vial 210 in substantially the reverse manner by which they were inserted. That is, the cam follower 224 is again activated by the second of the pair of cams 212 causing the mandrel segments 306 to collapse and the forming rollers 276 to translate apart. In this position, the tooling station 200 is lowered from engagement with the vial 210 by fall of the cam 204 and tracking thereby by the cam follower 202. The fall of the second cam 212 relaxes the yoke assembly 220 and the forming rollers 276 contract while the mandrel segments 306 expand. The tooling carriages 120, of course, continue to circulate about the conveyor assembly 74.

The extended path of circulation and the fact that the tooling stations 200 are performing the tooling functions approximately only one-third of the time, permits extended cooling time which results in an improved product. The ratio of tooling stations 200 to the pairs of chucking assemblies 16 and 18 which is 2:1 has been found to be optimum from both a cooling time and a production rate standpoint. The utilization of upper and lower pairs of rollers 196 and 198 to engage the respective collars 46 associated with the upper and lower chucking assemblies 16 and 18, respectively improves alignment of the vial finish forming components of the tooling station 200 and provides an improved product. Also, the threaded adjustment screws 282 associated with the forming rollers 276 and the adjustment mechanism 320 associated with the mandrel segments 306, provide accurate adjustment of the lateral translation thereof which may be accomplished while the machine is in operation thereby providing improved performance of the machine 10 as well as an improved product. The mandrel segments 306, secured by the threaded fasteners 310 may also be easily removed and replaced with other mandrels having diverse profiles. For example, a mandrel segment having a smooth vertical wall which would therefore form a complementary smooth inner vial finish (without a blowback cavity) may be utilized.

Finally, it should be noted that adjustment of the vertical positions of the lever arms 274 and thus the forming rollers 276 and the lever arms 304 and thus the mandrel segments 306 may simply and expeditiously be made by loosening the threaded fasteners 254 and independently adjusting the appropriate one of the screws 264 until the desired vertical position of the forming rollers 276 and the mandrel segments 306 is achieved. This adjustment, too, may be accomplished while the machine is operating.

The foregoing description is the best mode devised by the inventor for practicing this invention. However, the invention should not be construed to be limited by the foregoing description. It is apparent that various other embodiments incorporating modifications and variations will be obvious to one skilled in the art of vial forming machines. Such obvious variations are hereby included and the invention is deemed to be limited solely by the spirit and scope of the following claims.

What is claimed is:

1. A machine for working-end adjacent regions of thermoplastic material preforms such as glass preforms, comprising, in combination, a rotatable carousel having a plurality of pairs of vertically aligned upper and lower chucking assemblies disposed adjacent the periphery of said carousel and defining a respective plurality of vertical axes of rotation, each of said chucking assemblies having a collar defining an axis coaxial with said respective axis of rotation, means for rotating said carousel and said chucking assemblies, at least one tooling carriage positioned generally adjacent the periphery of said carousel, said tooling carriage including a drive sprocket and an idler sprocket rotatably mounted on said carriage, a chain disposed about said drive and idler sprockets, and a plurality of tooling stations secured to said chain for movement about the periphery of said tooling carriage, said plurality of tooling stations each including a pair of upper and a pair of lower means for engaging a respective one of said collars on said upper and lower chucking assemblies, a first pair of pivotally supported arms each arm having a respective forming roller rotatably secured thereto, a second pair of pivotally supported arms each arm having a segment of a mandrel secured thereto, and cam means disposed adjacent said first and said second pair of arms for pivoting said first pair of arms apart while pivoting said second pair of arms together and pivoting said first pair of arms together while pivoting said second pair of arms apart.

2. The machine of claim 1 wherein each of said pair of upper and said pair of lower engaging means comprises two rollers.

3. The machine of claim 1 wherein said carousel includes thirty-six (36) said pairs of vertically aligned chucking assemblies.

4. The machine of claim 1 or claim 3 wherein each tooling carriage includes nine (9) said tooling stations.

5. The machine of claim 1 wherein said carousel frame is disposed for rotation about a stationary structure and said tooling carriage includes means for pivotally securing said carriage to said stationary structure.

6. The machine of claim 5 further including a drive shaft means for transferring energy from said rotating means to said carriage, wherein the axis of rotation of said drive shaft means and the axis of pivot of said pivotally securing means are coincident.

7. The machine of claim 5 wherein said pivoting carriage includes means for selectively raising and lowering said tooling carriage relative to said frame structure.

8. The machine of claim 1 wherein said tooling carriage includes first cam means for raising and lowering said tooling stations and second cam means for translating said cam means disposed adjacent said first and said second pair of arms as said tooling station moves about the periphery of said tooling carriage.

9. The machine of claim 1 wherein said first pair of said pivotally supported arms and said adjacent cam means include complementarily disposed oblique surfaces, said second pair of pivotally supported arms and said adjacent cam means includes complementarily disposed oblique surfaces and said axes of pivot of said first and said second pairs of supporting arms and said axes of said forming rollers and said mandrel segments are parallel.

10. The machine of claim 1 wherein said first pair of pivotally supported arms and said second pair of pivotally supported arms include associated means for independently adjusting their vertical positions relative to said respective tooling station.

11. A machine for working-end adjacent regions of thermoplastic material preforms, comprising, in combination, a rotatable carousel, a plurality of pairs of vertically aligned upper and lower chucking assemblies disposed about the periphery of said carousel and defining a respective plurality of vertical axes of rotation, a collar disposed about each one of said chucking assemblies, said collar defining an axis coincident with said respective vertical axis drive means for rotating said carousel and for synchronously rotating each of said pairs of upper and lower chucking assemblies, at least one tooling carriage disposed generally adjacent the periphery of said carousel, said tooling carriage including a driver sprocket, an idler sprocket, a chain disposed about said drive and idler sprockets, a plurality of tooling stations secured to said chain, and means for rotating said drive sprocket and moving said tooling stations about said carriage; said plurality of tooling stations each including a pair of means for engaging said collar disposed about an upper chucking assembly of a pair of vertically aligned chucking assemblies and a vertically aligned pair of means for engaging said collar disposed about a lower chucking assembly of said pair of vertically aligned chucking assemblies, a first pair of pivoting means each pivoting means being a means for supporting a respective rotatable forming roller, a second pair of pivoting means each pivoting means being a means for supporting a segment of a mandrel and means for pivoting said first and said second pair of pivoting means whereby said forming rollers may be selectively advanced toward one another to form an exterior of a finish of an article while said mandrel segments may be moved away from one another to form the interior of a finish of an article.

12. The machine of claim 11 wherein said means for pivoting said first and said second pair of pivoting means includes a sliding structure having oblique camming surfaces which engage and pivot said first and said second pivoting means.

13. The machine of claim 11 wherein said mandrel segments each include a projection means for forming a reentrant region on the inner wall of a vial finish.

14. The machine of claim 11 further including a stationary frame and means for pivotally securing said carriage to said stationary frame, said pivotally securing means defining an axis of pivot.

15. The machine of claim 14 wherein said means for rotating said drive sprocket and circulating said stations about said carriage includes at least one drive shaft having an axis of rotation coincident with said axis of pivot.

16. The machine of claim 11 wherein said carousel includes thirty-six (36) said pairs of vertically aligned chucking assemblies and each of said tooling carriages includes nine (9) said tooling stations.

17. The machine of claim 11 wherein said tooling carriage includes first cam means for raising and lowering said tooling stations, second cam means for translating said means for pivoting said first and said second pair of pivoting means and said axes of pivot of said first and said second pairs of supporting arms and said axes of said forming rollers and said mandrel segments are parallel.

18. The machine of claim 11 wherein said first and said second pair of pivoting means are mounted in independent means for adjusting the vertical portion of said first and said second pivoting means relative to said respective tooling station.

19. The machine of claim 1 wherein each of said plurality of tooling stations defines a reference tooling axis, each of said pair of upper and pair of lower engaging means are disposed a uniform radial distance from said reference tooling axis, whereby said reference tooling axis and said axis of rotation of said chucking assemblies are coincident when said upper and lower engaging means are in contact with said collars of said chucking assemblies.

20. The machine of claim 19 wherein said pair of forming rollers are disposed for rotation on parallel axes equally spaced from and parallel to said tooling reference axis and said mandrel is generally coincident with and extends along said tooling reference axis.

21. The machine of claim 11 wherein each of said plurality of tooling stations defines a reference tooling axis and said pair of means for engaging said collar disposed about said upper chucking assembly are equidistant from said reference tooling axis and said pair of means for engaging said collar disposed about said lower chucking assembly are equidistant from said reference tooling axis.

22. A method of forming the finish portion of a glass vial or similar article comprising the steps of:
(a) for each of a plurality of articles:
  providing an article in a workable condition;
  providing a pair of spaced apart chucks disposed for rotation on a common vertical reference axis, each of said chucks having a collar secured thereto and disposed coaxially with said vertical reference axis;
  constraining said article in said chucks, and
  rotating said article about its length axis while said article is constrained in said chucks;
(b) for each of a plurality of working stations:
  providing a working station defining a tooling reference axis and having (1) two pairs of reference rollers, each of said pair of reference rollers disposed for engagement with a respective one of said chuck collars, (2) a segmented mandrel aligned with said tooling reference axis and (3) a pair of forming rollers, each being disposed for roation on an axis parallel to said tooling reference axis;

(c) moving each of said plurality of articles, while constrained in said chucks, around a rotatable carriage periphery to advance each article therearound for tooling finishing, (d) moving each of said plurality of working stations in proximity to the carriage periphery, (e) meeting each one of the advancing articles with one of the stations and advancing the station together with the article for and during finishing, (f) for each such working station and the article it works upon:

moving such working station into proximity with said chucks such that each of said pair of reference rollers engage a respective one of said collars and said vertical reference axis and said tooling reference axis coincide;

inserting the segments of the mandrel of such working station into the article; and forming the finish portion of the article by engaging the outside of the article with the forming rollers of such working station while expanding the mandrel segments and engaging the inside of such article with the expanded mandrel segments whereby the article is worked to a desired finish.

23. The method of claim 22 wherein said length axis of the article and the tooling reference axis are coincident during the finish forming step.

24. The method of claim 22 further including the step of collapsing said mandrel segments and releasing said forming rollers from engagement with such article.

* * * * *